US012755898B2

(12) United States Patent
Hameed et al.

(10) Patent No.: US 12,755,898 B2
(45) Date of Patent: Oct. 6, 2026

(54) VARIABLE MAGNETIC LAYER FOR WIRELESS CHARGING

(71) Applicant: 3M INNOVATIVE PROPERTIES COMPANY, St. Paul, MN (US)

(72) Inventors: Zohaib Hameed, Woodbury, MN (US); Milo G. Oien-Rochat, Minneapolis, MN (US); Charles L. Bruzzone, Woodbury, MN (US); Charles D. Hoyle, Stillwater, MN (US); Michael D. Benson, Mendota Heights, MN (US); Jennifer J. Sokol, Mahtomedi, MN (US); Jung Ju Suh, Seoul (KR)

(73) Assignee: 3M Innovative Properties Company, St. Paul, MN (US)

( * ) Notice: Subject to any disclaimer, the term of this patent is extended or adjusted under 35 U.S.C. 154(b) by 1200 days.

(21) Appl. No.: 17/765,171

(22) PCT Filed: Oct. 21, 2020

(86) PCT No.: PCT/IB2020/059908
§ 371 (c)(1),
(2) Date: Mar. 30, 2022

(87) PCT Pub. No.: WO2021/079293
PCT Pub. Date: Apr. 29, 2021

(65) Prior Publication Data

US 2022/0375683 A1 Nov. 24, 2022

Related U.S. Application Data

(60) Provisional application No. 62/925,854, filed on Oct. 25, 2019.

(51) Int. Cl.

| | |
|---|---|
| ***H01F 38/14*** | (2006.01) |
| ***H01F 27/28*** | (2006.01) |
| ***H01F 27/36*** | (2006.01) |

(52) U.S. Cl.
CPC ......... *H01F 38/14* (2013.01); *H01F 27/2804* (2013.01); *H01F 27/366* (2020.08); *H01F 2027/2819* (2013.01)

(58) Field of Classification Search
CPC .... H01F 38/14; H01F 27/366; H01F 27/2804; H01F 2027/2819; H02J 50/10; H02J 50/70

(Continued)

(56) References Cited

U.S. PATENT DOCUMENTS 7,211,986 B1 5/2007 Flowerdew et al.
7,804,272 B2 * 9/2010 Morita .................... B60L 5/005 320/108

(Continued)

FOREIGN PATENT DOCUMENTS

CN 107526046 B 7/2020
WO WO 2013-142066 9/2013

(Continued)

OTHER PUBLICATIONS

International Search Report for PCT Application No. PCT/IB2020/059908 mailed on Jan. 29, 2021, 5 pages.

*Primary Examiner* — Tszfung J Chan
(74) *Attorney, Agent, or Firm* — Jonathan L. Tolstedt

(57) ABSTRACT

A magnetic film assembly includes a coil having a plurality of turns defining a first major boundary surface of the coil, such that when energized, the coil generates an in-plane magnetic field component in a region of interest in air proximate and substantially parallel to the first major boundary surface, the in-plane magnetic field component having a magnetic field strength H that varies between a maximum Hmax and about 10% of Hmax in the region of interest in air; and a magnetic layer disposed on the coil so as to include the region of interest, such that when energized, the coil generates a magnetic field inducing an in-plane magnetic (Continued)

flux density B in the magnetic layer in the region of interest that varies less than about 5% in the region of interest.

5 Claims, 13 Drawing Sheets

(58) Field of Classification Search
USPC .................................. 336/200, 232; 307/104
See application file for complete search history.

(56) References Cited

U.S. PATENT DOCUMENTS

| | | | | |
|---|---|---|---|---|
| 9,583,253 | B2 | 2/2017 | Islinger | |
| 9,676,285 | B2 | 6/2017 | Niederhauser et al. | |
| 9,892,849 | B2 | 2/2018 | Kurs | |
| 2009/0102292 | A1* | 4/2009 | Cook | H01F 38/14 307/104 |
| 2010/0007215 | A1 | 1/2010 | Sakuma | |
| 2013/0314197 | A1* | 11/2013 | Jitaru | H01F 27/346 336/222 |
| 2015/0069851 | A1* | 3/2015 | Chung | H02J 50/402 307/104 |
| 2015/0102892 | A1 | 4/2015 | Yeo et al. | |
| 2015/0236518 | A1* | 8/2015 | Matsumoto | H02J 50/402 307/104 |
| 2016/0056664 | A1* | 2/2016 | Partovi | B60L 53/122 307/104 |
| 2016/0072296 | A1 | 3/2016 | Nejatali et al. | |
| 2017/0155288 | A1* | 6/2017 | Lee | H01F 1/26 |
| 2019/0058349 | A1* | 2/2019 | Kim | H01F 27/2823 |
| 2019/0348864 | A1* | 11/2019 | Pinciuc | H04B 5/79 |

FOREIGN PATENT DOCUMENTS

| | | |
|---|---|---|
| WO | WO 2018-007295 | 1/2018 |
| WO | WO 2019-141372 | 7/2019 |

* cited by examiner

VARIABLE MAGNETIC LAYER FOR WIRELESS CHARGING

CROSS REFERENCE TO RELATED APPLICATIONS

This application is a national stage filing under 35 U.S.C. 371 of PCT/IB2020/059908, filed Oct. 21, 2020, which claims the benefit of U.S. Provisional Application No. 62/925,854, filed Oct. 25, 2019, the disclosure of which are incorporated by reference in their entireties herein.

SUMMARY

In some aspects of the present description, a magnetic film assembly is provided, including a coil having a plurality of turns defining a first major boundary surface of the coil, such that, when energized, the coil generates an in-plane magnetic field component in a region of interest in air proximate and substantially parallel to the first major boundary surface, the in-plane magnetic field component having a magnetic field strength H that varies between a maximum Hmax and about 10% of Hmax in the region of interest in air; and a magnetic layer disposed on the coil so as to include the region of interest, such that when energized, the coil generates a magnetic field inducing an in-plane magnetic flux density B in the magnetic layer in the region of interest that varies less than about 5% in the region of interest.

In some aspects of the present description, a magnetic film assembly is provided, including a coil including an electrically conductive wire wound to form a plurality of substantially concentric loops; and a magnetic layer disposed on the coil and having a non-uniform thickness and a saturation magnetic flux density Bs, such that when energized, the coil generates a magnetic field inducing an in-plane magnetic flux density B in the magnetic layer, the non-uniformity in the thickness of the magnetic film causing B to be less than about 1.1 times Bs in a region of interest of the magnetic layer.

In some aspects of the present description, a magnetic film is provided, including a plurality of magnetic tiles arranged along a first in-plane direction of the magnetic film and stacked along a thickness direction of the magnetic film to define a plurality of stacked tiles arranged along the first direction, such that a number of the tiles in the stacked tiles varies along the first direction.

In some aspects of the present description, a magnetic film is provided, including a plurality of layers arranged in a thickness direction of the magnetic film, each layer including a plurality of substantially planar magnetic tiles arranged across the layer, wherein at least two layers in the plurality of layers have different number of tiles arranged across the corresponding layers.

In some aspects of the present description, a magnetic film is provided, including a plurality of discrete individual magnetic pieces arranged in width, length, and thickness directions of the magnetic film, the magnetic film including a central region proximate a center of the magnetic film, a peripheral region proximate a peripheral edge of the magnetic film, and a middle region disposed between the central and peripheral regions, the magnetic film having average thicknesses Tcen, Tmid, Tper in the respective central, middle and peripheral regions, such that Tmid is greater than Tcen and Tper.

In some aspects of the present description, a magnetic film assembly is provided, including a magnetic source configured to generate an in-plane magnetic field component in a region of interest in air proximate the magnetic source, the in-plane magnetic field component having a magnetic field strength H that has a greater value at a first location in the region of interest and a smaller value at a second location in the region of interest; and a magnetic film disposed on the magnetic source so as to include the region of interest, the magnetic film being thicker at the first location and thinner at the second location.

In some aspects of the present description, a system for a wireless power transmission is provided, including a power receiving assembly including a first magnetic film disposed between a first metal plate and a power receiving antenna; and a power transmitting assembly facing the power receiving assembly and including a second magnetic film disposed between a second metal plate and a power transmitting antenna, the power receiving and transmitting antennas facing, and substantially aligned with, one another, such that when energized, the power transmitting antenna wirelessly transmits power to the power receiving power, wherein at least one of the first and second magnetic films includes a plurality of stacked magnetic tiles arranged along a width and a length of the magnetic film, each stacked magnetic tiles including a plurality of tiles stacked along a thickness direction of the magnetic film, wherein at least two stacked magnetic tiles in the plurality of stacked magnetic tiles have different number of magnetic tiles.

In some aspects of the present description, a magnetic film is provided, including a plurality of magnetic tiles arranged along orthogonal first and second in-plane directions of the magnetic film and stacked along a thickness direction of the magnetic film to define a plurality of stacked tiles, at least two magnetic tiles in the plurality of magnetic tiles having two different magnetic materials having two different relative magnetic permeabilities at a same frequency, a thickness variation of the magnetic film less than about 20%, such that when the magnetic film is disposed on a coil, and the coil is energized to generate a magnetic field, the magnetic field induces an in-plane magnetic flux density B in the magnetic film, for at least one tile having a saturation magnetic flux density Bs, the different magnetic materials in the magnetic film causing B to be less than about 1.2 Bs in the at least one tile.

In some aspects of the present description, a magnetic film is provided, including a plurality of discrete magnetic segments arranged along a length and a width of the magnetic film, the segments having substantially a same composition, wherein at least two magnetic segments have different thicknesses.

In some aspects of the present description, a magnetic film is provided, including a plurality of discrete magnetic segments arranged along a length and a width of the magnetic film, the segments having substantially a same thickness, wherein at least two magnetic segments have different magnetic permeabilities.

In some aspects of the present description, a magnetic film is provided, such that, for a substantially planar coil that when energized, generates a magnetic field that for a line of interest proximate and substantially parallel to the coil, the magnetic field is oriented substantially along the line of interest at opposite first and second endpoints of the line of interest and oriented substantially orthogonal to the line of interest at a midway point between the first and second endpoints, if the magnetic film is disposed on the coil so at to be substantially parallel to the coil and include the line of interest, then, when energized, the coil generates a magnetic flux density B that is oriented substantially along the line of interest at least at the first and second endpoints and the midway point of the line.

DETAILED DESCRIPTION

Figure 1A:
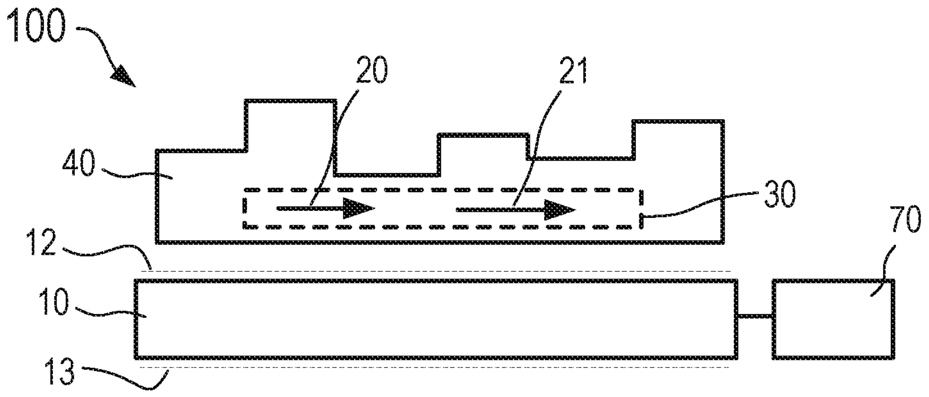
FIGS. 1A-1B provide alternate views of a magnetic film assembly, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

This application relates to wireless charging applications, where energy is transferred from a power transmitting device (e.g., a wireless charging station) to a power receiving device (e.g., a mobile device, an electric vehicle, etc.) Usually the wireless power transfer occurs between an induction coil in the charging device, which may create an alternating electromagnetic field, to a receiving coil in the device being charged which is disposed near the charging device. The receiving coil, when it is placed within the electromagnetic field of the charging coil, generates a current from the electromagnetic field (i.e., the electromagnetic field induces a current in the receiving coil) which is used to charge a battery or power cell within the device.

A wireless charging system may see inefficiencies due to magnetic field leakage to the environment, especially into metal. For example, magnetic fluxes in a wireless charging system may induce eddy currents in nearby conductive surfaces and create "competing" fields which can interfere with and reduce the efficiency of the electromagnetic field of the charging coil. One potential solution to this is to place a ferrite layer (e.g., a magnetic shielding film) between the receiving coil and nearby conductive surfaces. This ferrite layer can reduce the magnetic field reaching the conducting surface such that the overall efficiency is increased, relative to having no ferrite layer at all. However, the magnetic field strength, H, and the induced magnetic flux density, B, are not uniform across the coil assembly. The in-plane field strength is typically significantly larger over the conductor (i.e., the turns of the coil) and smaller at the center and the edges, where the conductor ends, contributing to inefficiencies in the charging system. While placing a ferrite layer of uniform thickness (such as a shielding film) across the coil assembly can be effective in preventing magnetic field leakage to the environment, the thickness of the entire ferrite layer must be based on the points of highest magnetic field strength generated by the coil. In other words, the same thickness of ferrite material is applied uniformly across the coil assembly, even in areas of weak magnetic field strength that need only a thin layer of ferrite (or none at all).

According to some aspects of the present description, a method of applying a variable thickness ferrite (magnetic) layer across the coil assembly is provided, disposing thicker or additional ferrite material in areas of the coil exhibiting a high magnetic field strength, and thinner material in areas exhibiting low magnetic field strength. By using a variable thickness magnetic layer, a significant cost and weight savings may be realized in reduction of materials (shown to be at least 35% in experiments) while offering substantially the same system level efficiency (e.g., less than 1% reduction in efficiency.)

In some embodiments, a magnetic film assembly (e.g., a wireless charging system) includes a coil having a plurality of turns and a magnetic layer (e.g., a ferrite layer or magnetic shielding film) disposed on the coil. In some embodiments, a first major boundary surface is defined for the coil, such that, when energized (i.e., when an electrical current is passed through the coil), the coil generates an in-plane magnetic field component in a region of interest in air proximate and substantially parallel to the first major boundary surface. In some embodiments, the in-plane magnetic field component may have a magnetic field strength, H, that varies between a maximum value, Hmax, and a minimum value approximately equal to 10% of Hmax in the region of interest in air (when no magnetic layer is present). In some embodiments, when a magnetic layer is disposed on the coil so as to include the region of interest (i.e., the region of interest is covered by and encompassed within the magnetic layer), when energized, the coil may generate a magnetic field which induces an in-plane magnetic flux density B in the magnetic layer in the region of interest, such that B varies less than about 5% across the region of interest. In some embodiments, the magnetic layer substantially covers the entire coil, when the assembly is seen in a plan view. In some embodiments, the magnetic layer covers only a portion of the coil when seen in a plan view.

In some embodiments, the coil may be substantially a planar coil, and the first major boundary surface may be a substantially planar surface (e.g., a substantially flat top surface of the planar coil). In some embodiments, the coil may define a second substantially planar major boundary surface of the coil on an opposite surface of the planar coil (e.g., a substantially flat bottom surface of the planar coil), which is substantially parallel to the first major boundary surface.

In some embodiments, the coil may be substantially a helical coil, where the first major boundary surface is a substantially cylindrical outer surface (i.e., the cylindrical surface around an exterior of the coil). In some embodiments, the coil may define a substantially cylindrical major inner boundary surface of the coil opposite to, and substantially concentric with, the first major boundary surface.

According to some aspects of the present description, a magnetic film assembly includes a coil (e.g., a charging coil, or a receiving coil, of a wireless charging system) formed of an electrically conductive wire wound to form a plurality of substantially concentric loops, and a magnetic layer disposed on the coil. In some embodiments, the magnetic layer may have a non-uniform thickness and exhibit a saturation magnetic flux density, Bs. When energized, the coil may generate a magnetic field which induces an in-plane magnetic flux density, B, in the magnetic layer, such that the non-uniformity in the thickness of the magnetic film causes B to be less than about 1.1 times Bs, or less than about 1.0 times Bs, or less than about 0.8 times Bs, or less than about 0.5 times Bs in a region of interest of the magnetic layer (e.g., a region of interest substantially parallel to and above an exterior surface of the coil).

In some embodiments, the coil may have a thickness Tc and the electrically conductive wire may have a thickness Tw such that the ratio Tc/Tw is less than about 1.5 (e.g., for a substantially flat spiral coil). In some embodiments, the coil thickness Tc and the wire thickness Tw may be such that the ratio Tc/Tw is greater than about 2 (e.g., for a helical coil). In some embodiments, the electrically conductive wire may be an uninsulated wire. In some embodiments, the electrically conductive wire may have a conductive inner core surrounded by an insulating layer (e.g., a dielectric material). In some embodiments, the electrically conductive wire may be a bundled wire (i.e., a plurality of conductive strands surrounded by an insulating layer).

According to some aspects of the present description, a magnetic film includes a plurality of magnetic tiles arranged along a first in-plane direction of the magnetic film (e.g., the x-axis), and stacked along a thickness direction of the magnetic film to define a plurality of stacked tiles (i.e., stacks of tiles, wherein each stacked tile may include one or more magnetic tiles) arranged along the first direction. In some embodiments, the number of the tiles in the stacked tiles varies along the first direction.

Smaller ferrite tiles are often used to create a larger contiguous ferrite layer. In some embodiments, the magnetic tiles may be made of one or more materials, including, but not limited to, soft magnetically conductive ferrite, magnetically conductive metal, magnetically conductive crystalline alloy, magnetically conductive nanocrystalline alloy, magnetically conductive amorphous alloy, and magnetically conductive composite. In some embodiments, the magnetic tiles may be ferrite tiles, such as those used in electrical vehicle charging systems. In some embodiments, the magnetic tiles may be tiles of magnetic shielding film. One example of a magnetic tile is the 3M™ Flux Field Directional Materials (FFDM), such as the EM15TF Series manufactured by the 3M Corporation. In some embodiments, one or more of the plurality of magnetic tiles may include a plurality of layers, with at least two of the layers being magnetic.

In some embodiments, the magnetic tiles may also be arranged along a second in-plane direction (e.g., the y-axis), orthogonal to the first in-plane direction, of the magnetic film and stacked along the thickness direction of the magnetic film (e.g., the z-axis) to define a plurality of stacked tiles arranged along the second direction, such that a number of the tiles in the stacked tiles varies along the second direction.

According to some aspects of the present description, a magnetic film includes a plurality of layers arranged in a thickness direction of the magnetic film, each layer including a plurality of substantially planar magnetic tiles arranged across the layer, wherein at least two layers in the plurality of layers have different number of tiles arranged across the corresponding layers. In some embodiments, each of the layers may have substantially the same thickness. In some embodiments, each of the magnetic tiles of the plurality of layers may have substantially the same thickness. In some embodiments, each magnetic tile may include a plurality of magnetic layers (e.g., layers of magnetic film disposed so as to create each tile). In some embodiments, each of the magnetic layers may be disposed on a corresponding substrate, which may be a non-magnetic substrate. In some embodiments, each magnetic tile may include a bonding layer (e.g., an adhesive film layer) which bonds neighboring magnetic layers to each other. In some embodiments, at least some of the magnetic tiles may have different shapes, and/or different relative dimensions.

According to some aspects of the present description, a magnetic film may include a plurality of discrete individual magnetic pieces (e.g., magnetic tiles) arranged in width, length, and thickness directions of the magnetic film. In some embodiments, the magnetic film may include a central region near a center of the magnetic film, a peripheral region near an edge of the magnetic film, and a middle region between the central and peripheral regions, such that the central, middle, and peripheral regions have respective average thicknesses Tcen, Tmid, and Tper. In some embodiments, Tmid is greater than Tcen and Tper (i.e., the tiles are arranged in shorter stacks near the center and outer edges than in the middle).

According to some aspects of the present description, a magnetic film assembly may include a magnetic source (e.g., a coil electrically coupled to a power source) and a magnetic film. In some embodiments, the magnetic source may be configured to generate an in-plane magnetic field component in a region of interest in air proximate the magnetic source. In some embodiments, the region of interest may be defined as a region of space disposed proximate and substantially parallel to the magnetic source (e.g., a "layer" of space near a substantially planar surface of the coil). In some embodiments, the in-plane magnetic field component may have a magnetic field strength (H) that has a greater value at a first location in the region of interest and a smaller value at a second location in the region of interest.

In some embodiments, the magnetic film may be disposed on the magnetic source so as to include the region of interest (i.e., the region of interest lies substantially within the magnetic film). In some embodiments, the magnetic film may be thicker at the first location and thinner at the second location. Stated another way, the magnetic film may be thinner at a location where H is smaller within the region of interest, and thicker where H is larger.

According to some aspects of the present description, a system for a wireless power transmission (e.g., a wireless charging system for an electrical vehicle or a handheld mobile device) may include a power receiving assembly and a power transmitting assembly facing the power receiving assembly. In some embodiments, the power receiving assembly may include a first metal plate, a power receiving antenna (e.g., a receiving coil), and a first magnetic film disposed between the first metal plate and the power receiving antenna. In some embodiments, the power transmitting assembly may include a second metal plate, a power transmitting antenna (e.g., a transmitting coil), and a second magnetic film disposed between the second metal plate and the power transmitting antenna.

In some embodiments, the power receiving antenna and the transmitting antenna may face each other, and be substantially aligned. In some embodiments, when the power transmitting antenna is energized, the power transmitting antenna may wirelessly transmit power to the power receiving power. In some embodiments, at least one of the first and second magnetic films may include a plurality of stacked magnetic tiles arranged along a width and a length of the magnetic film. In some embodiments, each of the stacked magnetic tiles may include a plurality of tiles stacked along a thickness direction of the magnetic film, where at least two of the stacked magnetic tiles have a different number of magnetic tiles. In some embodiments, the stacked magnetic tiles may vary in height due to each including a different number of magnetic tiles.

According to some aspects of the present description, a magnetic film may include a plurality of magnetic tiles arranged along orthogonal first and second in-plane directions of the magnetic film (e.g., the x- and y-axis) and stacked along a thickness direction of the magnetic film (e.g., the z-axis) to define a plurality of stacked tiles. For example, in some embodiments, the magnetic film may be defined by rows and columns forming a rectangular grid, where each location in the rectangular grid may be formed of a different number of vertically stacked magnetic tiles. In some embodiments, at least two of the magnetic tiles have two different magnetic materials, each magnetic material having a different relative magnetic permeability when measured at the same frequency. In some embodiments, the thickness variation across the magnetic film may be less than about 20%. In some embodiments, when the magnetic film is disposed on a coil, and the coil is energized to generate a magnetic field, the magnetic field induces an in-plane magnetic flux density, B, in the magnetic film, for at least one tile having a saturation magnetic flux density Bs, such that the different magnetic materials in the magnetic film cause B to be less than about 1.2 times Bs, or about 1.0 times Bs, or about 0.8 times Bs, or about 0.4 times Bs, in the at least one tile.

According to some aspects of the present description, a magnetic film includes a plurality of discrete magnetic segments arranged along a length (e.g., the x-axis) and a width (e.g., the y-axis) of the magnetic film, the segments having substantially the same composition (i.e., the same material) wherein at least two magnetic segments have different thicknesses (e.g., different heights in the z-axis). In some embodiments, the magnetic segments may be magnetic tiles of varying thicknesses. In some embodiments, the magnetic segments may be stacks of magnetic tiles, where the magnetic tiles each have substantially the same thickness and where at least one stack may have a differing number of magnetic tiles than at least one other stack.

According to some aspects of the present description, a substantially planar coil, when energized, generates a magnetic field that, for a line of interest proximate and substantially parallel to the coil, may be oriented substantially along the line of interest at opposite first and second endpoints of the line of interest and oriented substantially orthogonal to the line of interest at a midway point between the first and second endpoints. In some embodiments, a magnetic film may be disposed on the coil so at to be substantially parallel to the coil and include the line of interest such that, when energized, the coil may generate a magnetic flux density, B, that is oriented substantially along the line of interest at least at the first and second endpoints and the midway point of the line. For example, the line of interest may be disposed such that the midway point of the line coincides with the center of the coil, and the first and second endpoints are proximate to the outer edges of the coil (i.e., near the outermost turns of the coil).

Figure 1B:
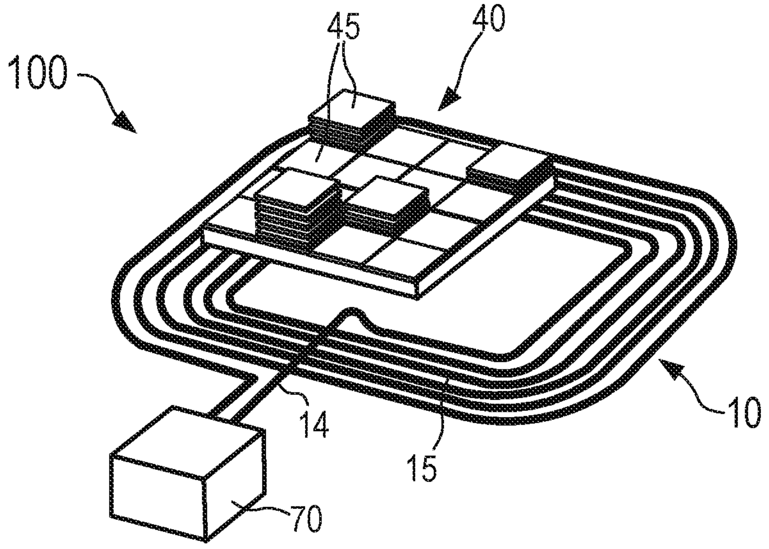

Turning now to the drawings, FIGS. 1A-1B provide alternate views of an embodiment of a magnetic film assembly, according to the present description. FIG. 1A is a side, cross-sectional view of magnetic film assembly 100, including a coil 10 (shown in FIG. 1A as a rectangular profile, but typically including a number of turns, as shown by element 11 in FIG. 1B) and a magnetic layer 40. In some embodiments, magnetic layer 40 may be a magnetic film with areas of varying thickness, and is disposed substantially parallel to a first major boundary surface 12 of the coil. In some embodiments, coil 10 defines a second major boundary surface 13 on a surface of coil 10 opposite to first major boundary surface 12. In some embodiments, magnetic layer 40 may cover substantially all of coil 10 (i.e., substantially all of first major boundary surface 12). In some embodiments, magnetic layer 40 may cover only a portion of coil 10. In some embodiments, coil 10 may be electrically connected to a power source 70, such that coil 10 may be energized (i.e., a current passed through coil 10) such that coil 10 generates an electromagnetic field which may be used for transferring power wirelessly to a corresponding receiving coil (not shown).

In some embodiments, magnetic layer 40 is positioned such that it covers and includes a region of interest 30, which, for the purposes of discussion is defined in air above coil 10, and is not defined by the magnetic layer 40 itself. That is, the region of interest 30 is defined relative to coil 10, and is only included within the magnetic layer 40 when magnetic layer 40 is disposed on coil 10 so as to encompass region of interest 30. Region of interest 30 is defined as a reference area in which the behavior of a magnetic field generated by coil 10 is considered for discussion purposes. For example, in some embodiments, when coil 10 is energized, an in-plane magnetic field component 20 is generated within region of interest 30. In some embodiments, in-plane magnetic field component 20 may have a magnetic field strength (H) that varies across the coil 10 (e.g., stronger over the conductors that make up coil 10, weaker in the center and edges where there are no conductors). If Hmax represents the maximum magnetic field strength H seen across coil 10, then H may vary from Hmax to about 10% of Hmax within at least the region of interest. It should be noted that, as FIG. 1A is a cross-sectional view, the region of interest 30 is represented by a two-dimensional rectangle. However, in reality, region of interest 30 may be a three-dimensional volume, such as a rectangular prism (or any appropriate volume shape) extending in air over at least a portion of coil 10.

In some embodiments, when magnetic layer 40 is disposed on or proximate to coil 10 such that it includes the region of interest, coil 10 (when energized) may generate a magnetic field which induces an in-plane magnetic flux density (B) 21 in magnetic layer 40 within the region of interest 30 that varies less than about 5% throughout region of interest 30. Stated in simpler terms, the presence of magnetic layer 40 positioned to cover region of interest 30 forms a magnetic flux density 21 which is substantially uniform across the region of interest.

It should be noted that a magnetic layer disposed over a coil generating a magnetic field, whether the magnetic layer is a constant thickness or of a variable thickness, will suppress and reduce the magnetic flux density, B, produced by the magnetic field generated by the coil, and may be used to reduce the induction of eddy currents in surrounding structures (e.g., electrically-conductive metal structures such as those on an electric vehicle). However, using a magnetic layer of constant (uniform) thickness over a magnetic field of varying field strength H will lead to a flux density B that is also variable, as the relationship of field strength H to flux density B is generally defined by the equation $B=\mu_r\mu_0 H$, where $\mu_0$ is a constant (the permeability of free space) and $\mu_r$ is the relative permeability (of a nearby material). This equation defines an essentially linear relationship between B and H for smaller values of H (as demonstrated in FIG. 5), such that, when a constant thickness magnetic layer is used, the resulting B values are proportional to the varying H values (which, in some embodiments, vary from Hmax to about 10% of Hmax).

By using a magnetic layer of varying thickness (such as, for example, magnetic layer 40 in FIG. 1A), the magnetic layer can be made such that thicker portions cover areas with a higher H values and thinner portions cover areas with relatively lower H values. That is, a varying thickness magnetic layer can be used to create a substantially uniform B field in the presence of a varying H field. This also has the effect of reducing the amount of material needed for the magnetic layer, reducing the cost and/or weight of the overall system without a significant reduction in power transfer efficiency. When a constant thickness magnetic layer is employed, the thickness is by necessity determined by the maximum H field generated by one or two locations on the coil. However, by using a variable thickness magnetic layer, only enough material is needed in each location to ensure that the induced B field (local to that location) is adequately suppressed (and substantially uniform from one location on the magnetic layer to the next).

FIG. 1B shows an alternate, perspective view of magnetic film assembly 100, showing additional details on coil 10 and magnetic film 40. In some embodiments, coil 10 may be an electrically conductive wire 14 (or similar electrical conductor) wound to form a series of substantially concentric turns or loops 15. In the embodiment of FIG. 1B, the configuration of coil 10 is a spiral coil, but other configurations are possible (such as the helical coil 10*a* of FIG. 2A, discussed elsewhere herein).

In some embodiments, magnetic layer 40 may be so formed so as to have area of varying thickness 45, where the local thickness for each area of varying thickness 45 is determined by the strength of the magnetic field H generated near the corresponding location on coil 10. It should be noted that the example configuration of magnetic layer 40 shown in FIGS. 1A and 1B is intended to demonstrate a magnetic layer of varying thickness, and the exact shape of the magnetic layer is not necessarily shown as it would be applied to coil 10 to generate a substantially uniform B field as described elsewhere herein.

Figure 2A:
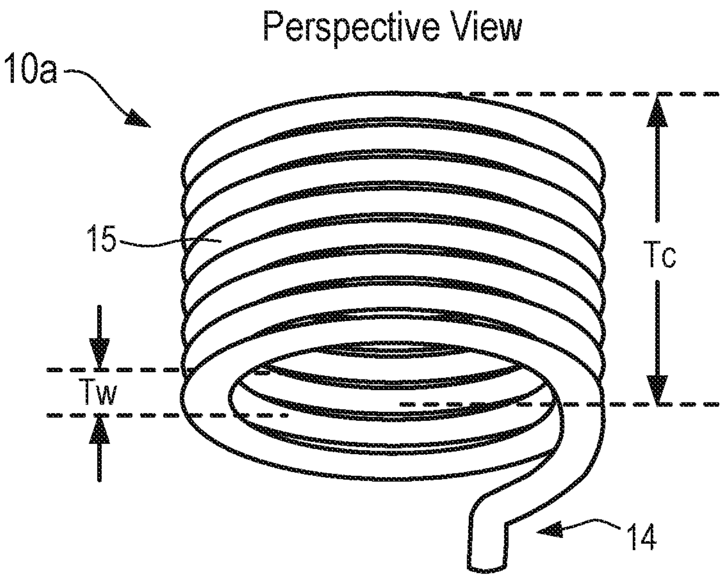
FIGS. 2A-2B provide alternate views of a helical coil for a magnetic film assembly, in accordance with an embodiment of the present description.
Figure 2B:
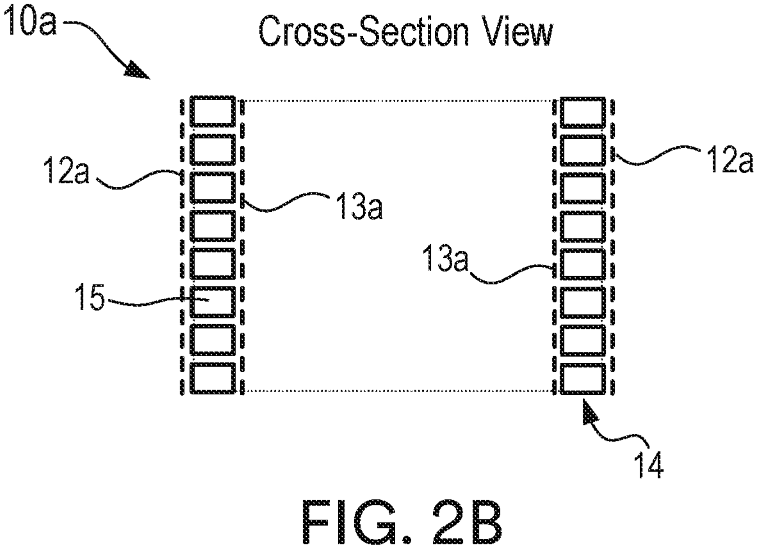

FIGS. 2A-2B show an alternate embodiment of a coil for use in a magnetic film assembly as described herein. Coil 10*a* has a helical configuration, where the turns 15 of electrically conductive wire 14 take the shape of a helix (similar to DNA strand, or a spiral staircase). In some embodiments, coil 10*a* may have a thickness, Tc, and electrically conductive wire 14 has a thickness Tw, such that the ratio Tc/Tw is greater than about 2 (i.e., the height of the overall coil is at least twice as high as the thickness of wire 14.) Conversely, for a spiral coil configuration, such as coil 10 shown in FIG. 1B (or coil 10*b* of FIG. 3), the ratio Tc/Tw may be less than about 1.5 (i.e., the height of the overall coil is largely defined by the thickness of wire 14).

Turning to the cross-sectional view of FIG. 2B, it is shown that the first major boundary surface 12*a* is defined by the cylindrical exterior surface of coil 10*a* (compared to the substantially planar first major boundary surface 12 for the spiral coil 10 of FIG. 1A), and the second major boundary surface 13*a* is defined by the cylindrical interior surface of coil 10*a*. That is, in some embodiments of a wireless charging system, a helical power transmitting coil may be disposed proximate and/or adjacent to a helical power receiving coil such that the first major boundary surface 12*a* of each coil are next to each other (i.e., the "cylinders" are side-by-side), and any magnetic layer applied as described herein would wrap around at least a portion of at least one of the surfaces 12*a*, or may be disposed between the side-by-side coils. In some embodiments, two helical coils may be disposed such that one helical coil is above the other (i.e., like stacked "cylinders"). In this embodiment, the first major boundary surface may be defined to be between the ends of the cylindrical coils (similar to first major boundary surface 12 shown in FIG. 1A).

Figure 3:
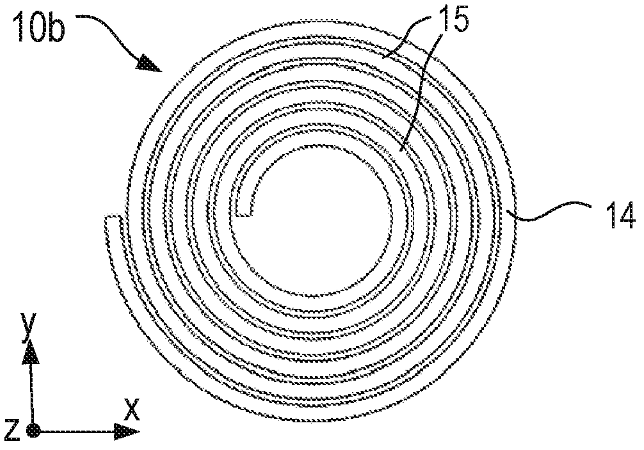
FIG. 3 is a top view of a spiral coil for a magnetic film assembly, in accordance with an embodiment of the present description.
Figures 4A, 4B, 4C:
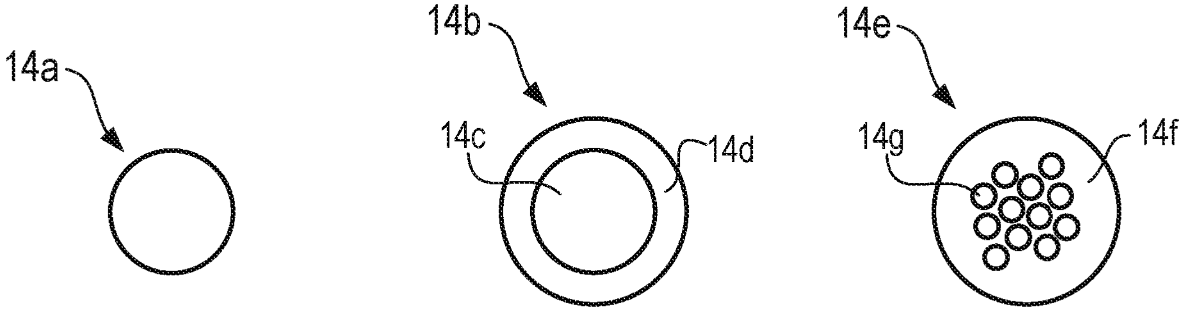
FIGS. 4A-4C provide alternate views of an electrically conductive conductor, in accordance with an embodiment of the present description.

FIG. 3 is a top view of a spiral coil for a magnetic film assembly, according to the present description. Spiral coil 10*b* includes an electrically conductive wire 14 wound in a spiral fashion to create a series of substantially concentric turns or loops 15. The spiral coil 10*b* shown in FIG. 3 is generally circular in shape, but other shapes and configurations are possible, including, for example, the roughly square-shaped turns shown in FIG. 1B. FIGS. 4A-4C illustrate alternate embodiments of an electrically-conductive conductor which may be used to create the turns of a spiral or helical coil. 14. FIG. 4A shows a cross-sectional view of an electrically-conductive conductor 14*a* which is a single, uninsulated wire. FIG. 4B shows a cross-sectional view of an electrically-conductive conductor 14*b* which is a single conductor (wire) 14*c* encased in an outer, insulating layer 14*d*. FIG. 4C shows a cross-sectional view of an electrically-conductive conductor 14*e* which includes a number of conductors (wires) 14*g*, which may be twisted or braided, encased in an outer, insulating layer 14*f*. Other types of conductor 14 are possible and within the scope of the present disclosure. In some embodiments, the cross-sectional profile of the conductor may be circular (as shown at least in FIGS. 4A-4C), elliptical, square, rectangular, or any other appropriate profile shape.

Figure 5:
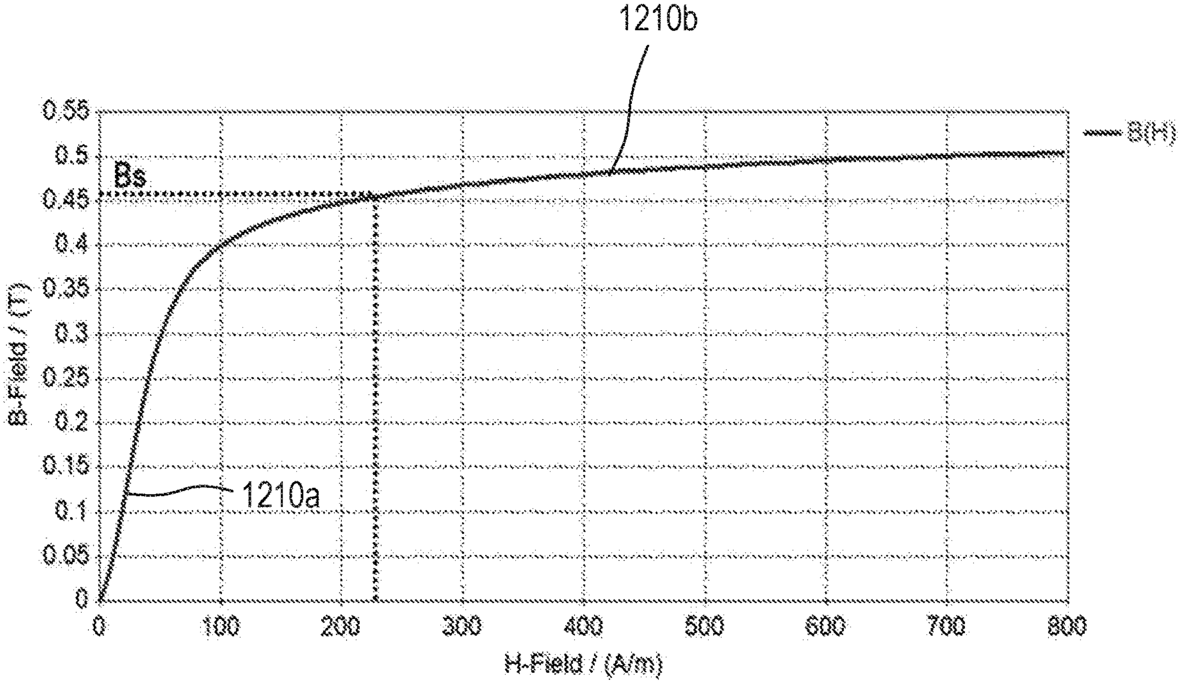
FIG. 5 is a plot of magnetic field strength (H) versus magnetic flux density (B), in accordance with an embodiment of the present description.

FIG. 5 is a plot 1200 of magnetic flux density (B) versus magnetic field strength (H), illustrating the importance of a magnetic layer. The plot line 1200 (including 1200*a*/1200*b*) is a plot of magnetic field strength, H, along the x-axis (i.e., the horizontal axis) versus magnetic flux density, B, along the y-axis (i.e., the vertical axis). As can be seen from plot 1200, the B field increases steeply as the magnetic strength H increases (see the portion of the plot labeled 1210*a*), until the system reaches the magnetic saturation point, Bs. At this point, the increase in B is significantly reduced for continuing increases in H (see plot segment 1210*b*). This is an important point, as once the system reaches magnetic saturation (when the B field reaches Bs, or a significant fraction thereof), the inductance of the coil abruptly decreases and normal wireless charging operations may be reduced or fail completely. To prevent the system from reaching the magnetic saturation point, a magnetic layer (such as magnetic layer 40 of FIG. 1A) is disposed in proximity to the coil to reduce the magnitude of the B field generated (to keep the system well below magnetic saturation point, Bs). As previously described, and based on the corresponding plot 1200 for the system being designed, the magnetic layer can be made to have a variable thickness, such that each location of the B field across the coil (and, in particular, within the region of interest 30 as shown in FIG. 1A) remains below the magnetic saturation point (and preferably at a level low on the 1210*a* portion of plot 1200). In other words, if we assume the magnetic layer being designed is substantially planar and represented by a grid of points in an x-y plane (see, for example, the magnetic layer 200 shown in FIG. 6B), the thickness of each x-y location on the grid may be selected such that only the amount of material needed to keep the magnitude of the B field well below the saturation point (e.g., less than half of Bs), and preferably at a constant level across the layer, is used at each location.

Figure 6A:
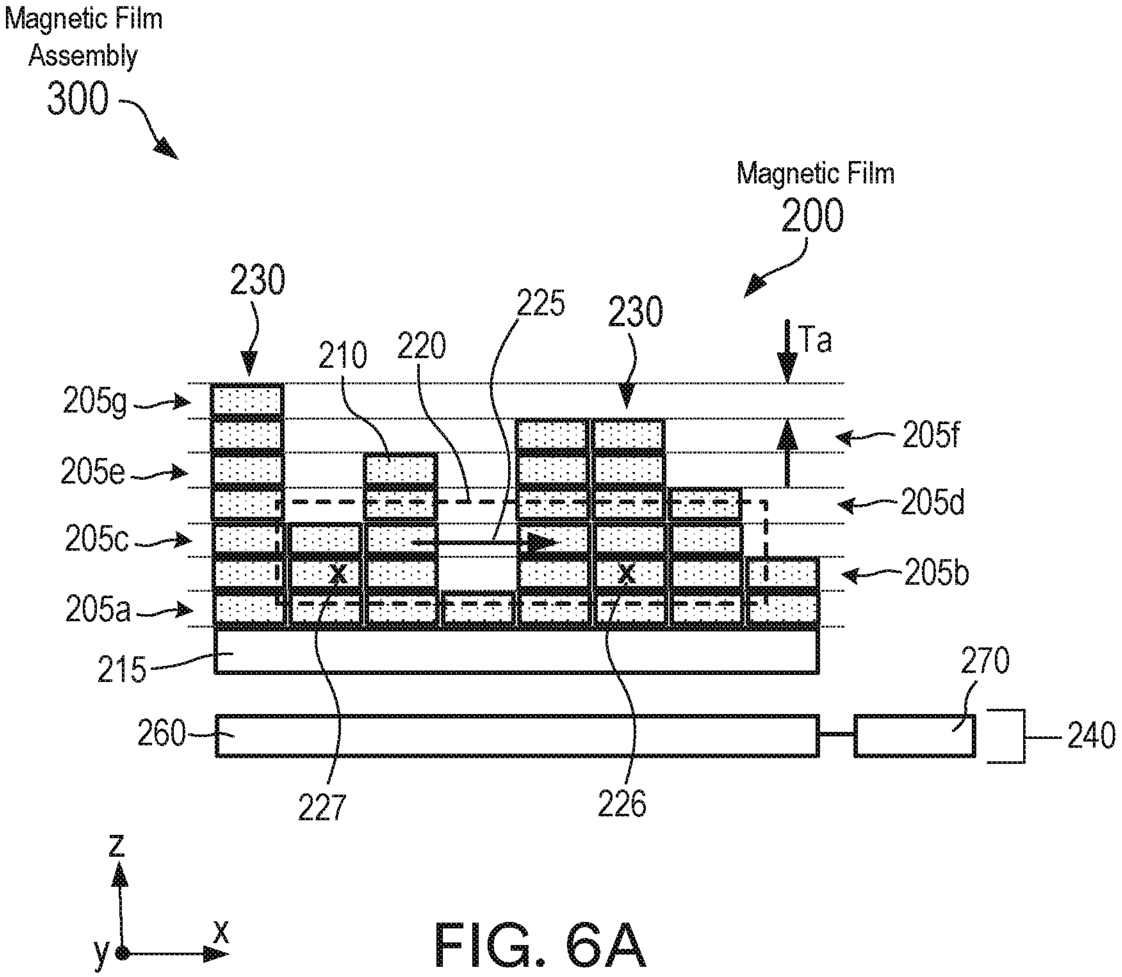
FIGS. 6A-6B provide alternate views of a variable thickness magnetic layer, in accordance with an embodiment of the present description.
Figure 6B:
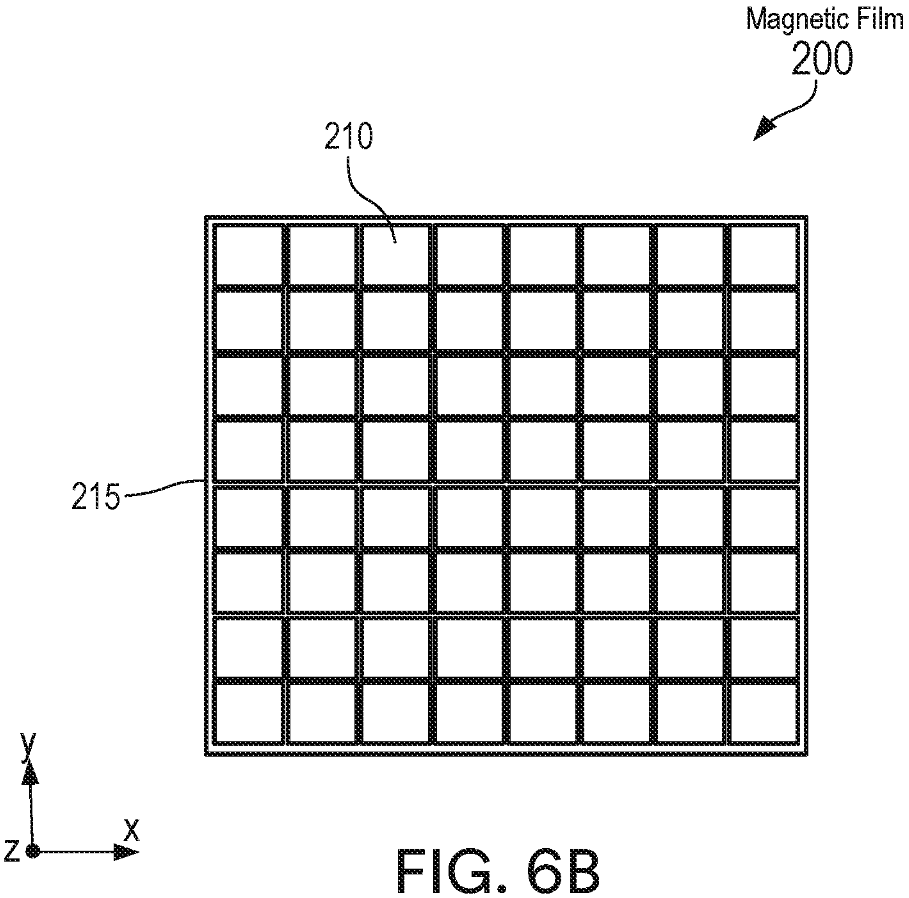

FIGS. 6A-6B provide alternate views of a variable thickness magnetic layer, according to the present description. Turning first to FIG. 6A, a magnetic film assembly 300 includes a magnetic film 200 and a magnetic source 240. In some embodiments, magnetic source 240 may include a coil 260 electrically coupled to a power source 270 (e.g., a coil of a wireless charging system). In some embodiments, magnetic film 200 includes a plurality of layers 205*a*-205*g*, which are arranged in a thickness direction (i.e., the z-axis, as indicated in FIG. 6A). In some embodiments, each of layers 205*a*-205*g* is made up of one or more magnetic tiles 210, creating one or more stacked tiles 230 (i.e., a stacked tile 230 is created from a stack of two or more magnetic tiles 210). In some embodiments, magnetic tiles 210 are substantially planar. In some embodiments, at least two of the layers 205*a*-205*g* have a different number of tiles arranged across the corresponding layers. For example, layer 205*a* is shown as containing 8 magnetic tiles 210 (as seen in a cross-section), where layer 205*e* has only 4 magnetic tiles 210 across it. Stated another way, in some embodiments, the number of magnetic tiles 210 in each of stacked tiles 230 may vary along the thickness direction. In some embodiments, magnetic tiles may be disposed on a substrate 215 (e.g., a polymeric film substrate). In some embodiments, each of layers 205*a*-205*g* may have substantially the same thickness, Ta. In some embodiments, magnetic tiles 210 may have substantially the same thickness, Ta. That is, in some embodiments, the thickness Ta of layers 205*a*-205*g* may be defined by the thickness of magnetic tiles 210.

In some embodiments, magnetic source 240 may generate an in-plane magnetic field component 225 in a region of interest 220. Region of interest 220 shall be defined in air in a region proximate to magnetic source 240. In some embodiments, magnetic field component 225 may have a magnetic field strength (H) that has a value greater at a first location 226 within the region of interest 220 than the value at a second location 227 within the region of interest 220. In some embodiments, the magnetic film 200 may be disposed on or proximate to magnetic source 240 such that it includes the region of interest 220. In some embodiments, magnetic film 200 may be thicker (e.g., have more vertically-stacked magnetic tiles 210) at first location 226 than it is at second location 227. For example, the embodiment of FIG. 6A shows a stacked tile 230 coincident with location 226 with 6 magnetic tiles 210, and the stacked tile 230 coincident with location 227 has only 3 magnetic tiles 210. In some embodiments, the thickness of each stacked tile 230 may be defined by the magnitude of the corresponding value of H at the location coincident with each stacked tile 230.

FIG. 6B provides an alternate, top view of magnetic film 200, showing magnetic tiles 210 arranged in a pattern (e.g., a grid-like pattern) on a substrate 215. FIG. 6B is provided to show magnetic film 200 from a different perspective, and is not meant to be limiting in any way. Although the shape of magnetic film 200 is shown as rectangular in FIG. 6B, with magnetic tiles 210 arranged in a grid (in stacks of varying thickness, not seen in the top view), any appropriate shape, configuration, or arrangement of magnetic film 200 and magnetic tiles 210 may be used. For example, in some embodiments, magnetic film 200 may be circular, elliptical, triangular, or any other shape needed to cover the appropriate portions of the magnetic coil.

In some embodiments, the magnetic tiles may include, but not be limited to, one or more of the following materials: soft magnetically conductive ferrite, magnetically conductive metal, magnetically conductive crystalline alloy, magnetically conductive nanocrystalline alloy, magnetically conductive amorphous alloy, and magnetically conductive composite.

Figure 7:
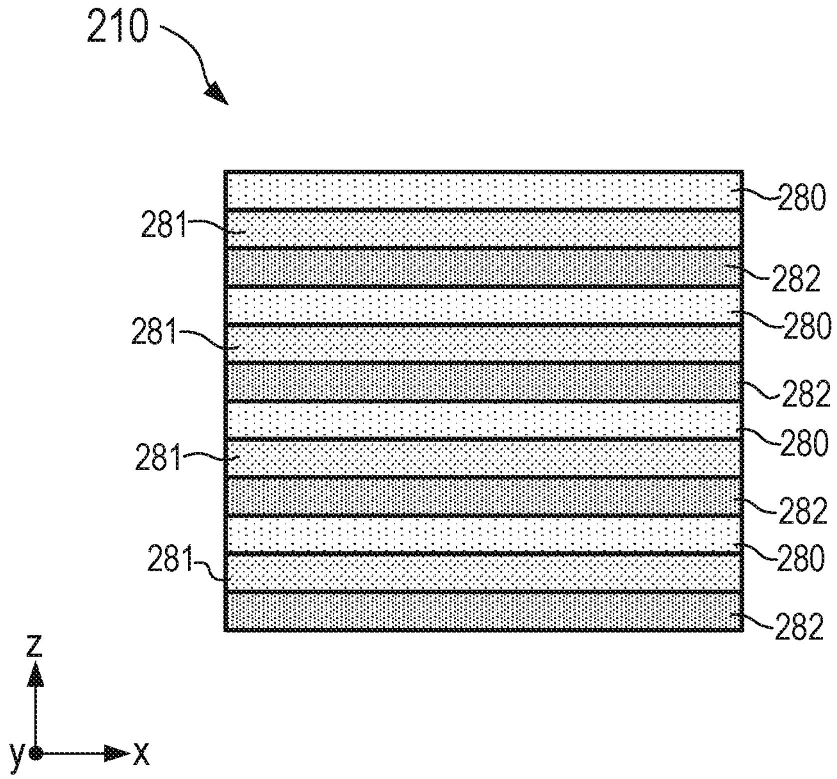
FIG. 7 is a side view of a multilayer magnetic film, in accordance with an embodiment of the present description.

In some embodiments, each of the magnetic tiles 210 may be a multilayer magnetic film. FIG. 7 provides a side view of one embodiment of a magnetic tile 210 as a multilayer magnetic film, according to the present description. In some embodiments, one or more of magnetic tiles 210 may include a plurality of layers. The embodiment of FIG. 7 shows three separate layer types 280, 281, and 282, arranged in a thickness direction (e.g., the z-axis as shown in FIG. 7). In some embodiments, at least two of these layer types may be magnetic. In some embodiments, only one of the layer types (e.g., layers 280) may be magnetic. In some embodiments, each of magnetic layers 280 may be disposed on a corresponding non-magnetic substrate 281. In some embodiments, a bonding layer 282 may bond neighboring magnetic layers 280 (including, in some embodiments, substrate layers 281) to each other.

Figure 8:
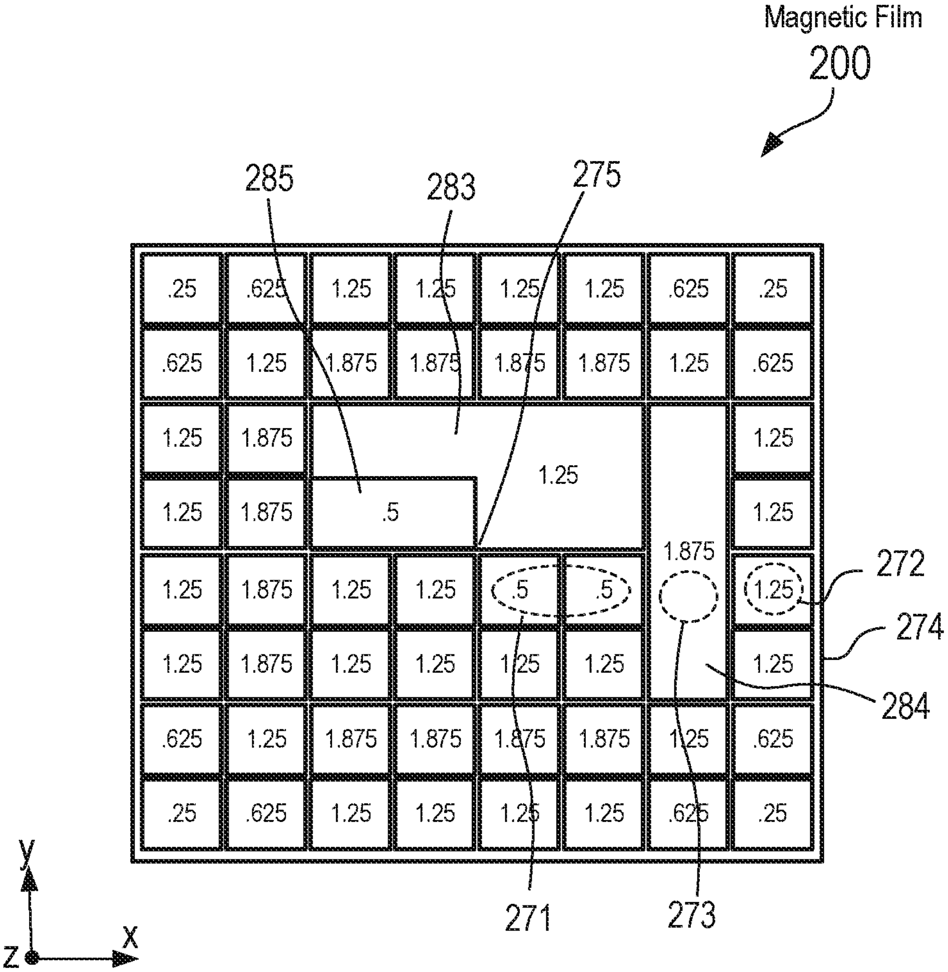
FIG. 8 is a top view of a variable thickness magnetic layer, in accordance with an embodiment of the present description.

FIG. 8 is a top view of a variable thickness magnetic layer, according to the present description, showing one possible embodiment of magnetic tile distribution across a magnetic film 200. Magnetic film 200 is represented here as an 8×8 grid/matrix of magnetic tiles, although some of the magnetic tiles are shown as merged into larger tiles for the purposes of discussion, as will be described elsewhere herein. The thickness of each magnetic tile or region in millimeters (mm) is printed on the magnetic tile or region. For example, the thickness of the four magnetic tiles at the four corners of the square magnetic film 200 is 0.25 millimeters. The thicknesses of each magnetic tile or region shown, in this example, are selected based on the value of the induced B-field corresponding to that tile or region.

The magnetic film 200 may be divided into discrete, individual magnetic pieces (i.e., magnetic tiles) arranged in width, length and thickness directions of the magnetic film 200, or the y-axis, x-axis, and z-axis, respectively, as indicated in FIG. 8. For discussion purposes, magnetic film 200 is divided into various regions, including a central region 271 (located near the center 275 of magnetic film 200), a peripheral region 272 (located near an edge of magnetic film 200), and a middle region 273 (disposed between the central region 271 and the peripheral region 272). Magnetic film 200 of FIG. 8 may have been designed to correspond to a spiral coil, such as coil 10 of FIG. 1B. The central region 271 may correspond to the center of the coil, where no conductors are present, such that the strength of the induced B-field in this region is relatively low, and, accordingly, the thickness of the tiles in the central region 271 (shown as 0.5 mm in FIG. 8) is relatively thin compared to the thickness of the times in the middle region 273. Middle region 273 may correspond to the area above the turns (i.e., conductors) of the coil, where the induced B-field is relatively larger. In some embodiments, the segments (e.g., tiles) of magnetic film 200 in central region 271 may have an average thickness, Tcen, the segments in the middle region 273 may have an average thickness Tmid, and the segments in the peripheral region 272 may have an average thickness Tper, such that Tmid is greater than Tcen and Tper.

As previously described, the embodiment of magnetic film 200 as shown in FIG. 8 may be created as an 8×8 grid or matrix of magnetic tiles. The shape and size of film 200, the number, configuration, and arrangement of tiles, and the relative dimensions of the tiles can vary, and the embodiment shown here is intended for illustrative purposes only. In some embodiments, rather than a grid of tiles of equal dimension, at least two of the tiles forming magnetic film 200 may have different shapes, such as magnetic tiles 283 and 284. In some embodiments, at least two of the tiles may have the same shape (e.g., rectangular) but different relative dimensions, such as magnetic tiles 284 and 285.

Figure 9:
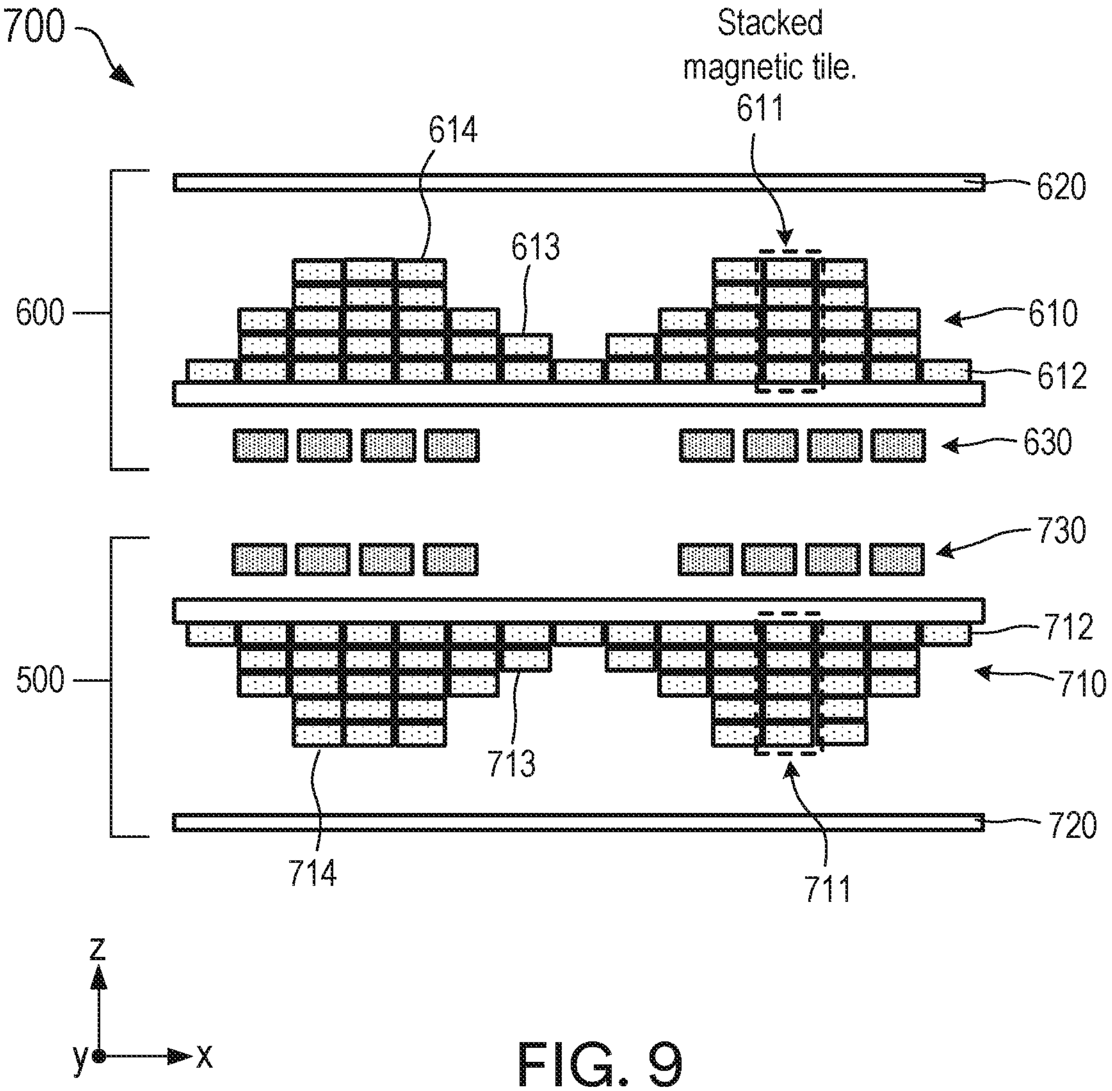
FIG. 9 is a side, cross-sectional view of a system for wireless power transmission, in accordance with an embodiment of the present description.

FIG. 9 is a side, cross-sectional view of a system for wireless power transmission, according to the present description. In some embodiments, the wireless power transmission system 700 may include a power receiving assembly 600 (e.g., a mobile device) and a power transmitting assembly 500 (e.g., a wireless charging station for a mobile device). In some embodiments, the power receiving assembly 600 includes a first magnetic film 610 disposed between a first metal plate 620 and a power receiving antenna 630. In some embodiments, the power receiving antenna 630 may be a coil including an electrically conducting wire wound into turns. The depiction of power receiving antenna 630 in FIG. 9 shows the cross-sectional profile of several turns of a coil. In some embodiments, the power transmitting assembly 500 includes a second magnetic film 710 disposed between a second metal plate 720 and a power transmitting antenna 730. The power receiving antenna 630 and power transmitting antenna 730 are substantially aligned with each other. When the power transmitting antenna 730 is energized (e.g., a current is passed through the turns of the coil), the power transmitting antenna 730 wirelessly transmits power to the power receiving antenna.

In some embodiments, at least one of the first and second magnetic films may include a plurality of stacked magnetic tiles 611, 711 arranged along a width (e.g., the x-axis as shown in FIG. 9) and a length (e.g., the z-axis) of the magnetic film. In some embodiments, each of the stacked magnetic tiles may include a plurality of magnetic tiles 612, 712 stacked along a thickness direction (e.g., the z-axis as shown in FIG. 9) of the magnetic film. In some embodiments, at least two of the stacked magnetic tiles, for example, 713 and 714 (or 613 and 614) have a different number of magnetic tiles (i.e., causing each of the stacked magnetic tiles 713 and 714, or 613 and 614, to be a different thickness along the z-axis).

Figure 10:
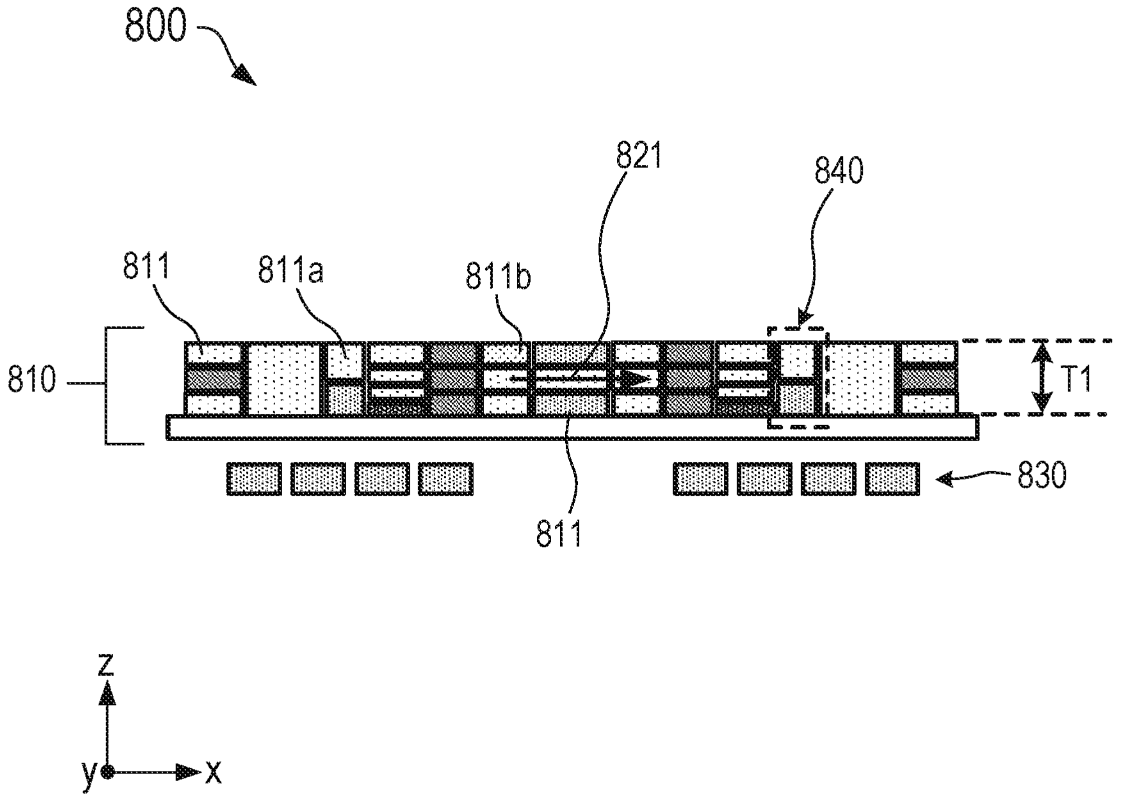
FIG. 10 is a side, cross-sectional view of a magnetic film, in accordance with an embodiment of the present description.

In some embodiments of the magnetic film, the magnetic film may have a constant overall thickness, but achieve the substantially uniform B field by including tiles of differing magnetic materials with different relative magnetic permeabilities across the film. FIG. 10 is a side, cross-sectional view of one such embodiment of a magnetic film, according to the present description. A magnetic film assembly 800 may include a magnetic film 810 disposed proximate to a coil 830. The magnetic film 810 may have a thickness T1 that is substantially constant over the magnetic film 810, or which varies less than about 20%, or less than about 10%, or less than about 5%, over the magnetic film.

In some embodiments, the magnetic film 810 may include a plurality of magnetic tiles 811 arranged along a first in-plane direction (e.g., the x-axis as shown in FIG. 10) and a second in-plane direction (e.g., the y-axis) and stacked along a thickness direction (e.g., the z-axis). Two or more magnetic tiles disposed on each other (i.e., stacked in the z direction) create a stacked magnetic tile 840. In some embodiments, at least two of the magnetic tiles 811 (e.g., **811*a* and 811*b***) may be of two different magnetic materials, each having a different relative magnetic permeability when measured at the same frequency.

In some embodiments, when coil 830 is energized (e.g., an electrical current is passed through the turns of the coil), a magnetic field is generated, which in turn induces an in-plane magnetic flux density B 821 within the magnetic film 810. In some embodiments, the different magnetic materials used in the magnetic tiles 811 may cause the induced magnetic flux density 821 to be less than about 1.2 times, or less than about 1.0 times, or less than about 0.8 times, or less than about 0.4 times, the magnetic saturation level, Bs, of the magnetic film 810.

Figure 11A:
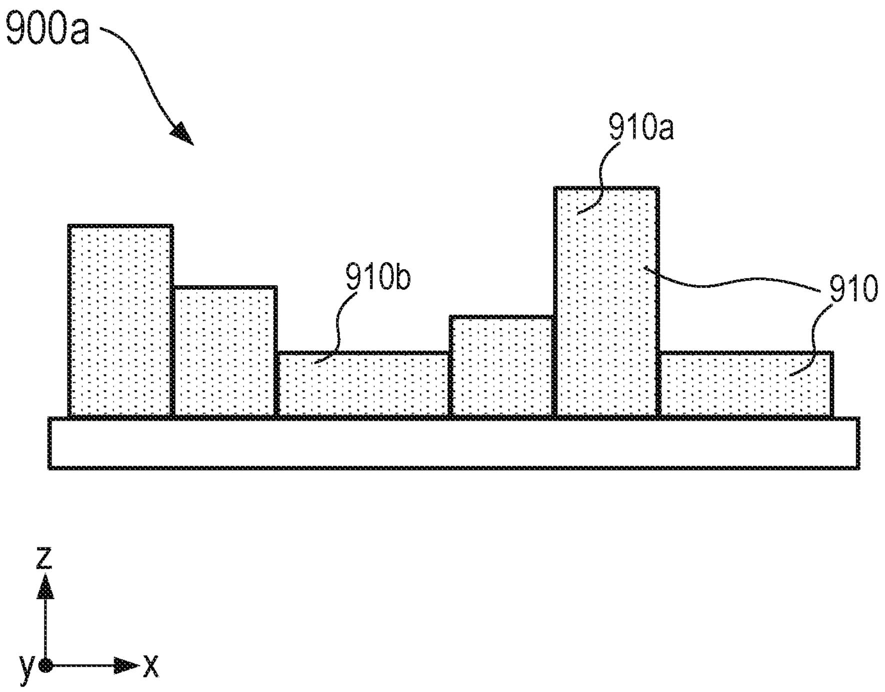
FIGS. 11A-11B are side, cross-sectional views of variations of a magnetic film, in accordance with alternate embodiments of the present description.

Many of the example embodiments discussed herein describe magnetic layers or magnetic films of varying thickness created by the stacking of smaller magnetic tiles, where each of the magnetic tiles has substantially the same relative dimensions. Variations in thickness across the magnetic films are achieved by changing the number of magnetic tiles used in each "stacked magnetic tile." In some embodiments, it may be desirable to use magnetic segments that inherently have different thicknesses, without requiring the stacking of multiple tiles, to create the variable thickness magnetic layer. FIG. 11A provides a side, cross-sectional view of one such embodiment of a magnetic film. Magnetic film **900*a* includes a number of discrete magnetic segments 910 arranged along the length (e.g., the x-axis as shown in FIG. 11A) and the width (e.g., the y-axis) of the magnetic film 900*a*. In some embodiments, each of the magnetic segments 910 may have a substantially similar composition, but may have different thicknesses. For example, the thicknesses of segments 910*a* and 910*b*** are significantly different.

Figure 11B:
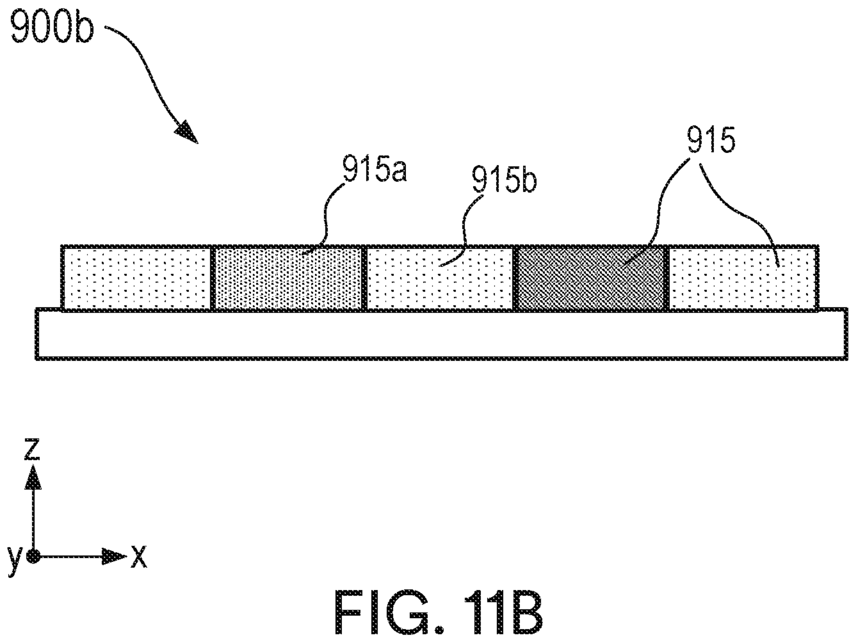

In some embodiments, it may be desirable to use magnetic segments that have substantially the same thickness, but which are of different materials and/or which have different magnetic permeabilities. FIG. 11B provides a side, cross-sectional view of one such embodiment of a magnetic film. Magnetic film **900*b* includes a number of discrete magnetic segments 915 arranged along the length (e.g., the x-axis as shown in FIG. 11B) and the width (e.g., the y-axis) of the magnetic film 900*b*. In some embodiments, each of the magnetic segments 915 may have substantially the same thickness (e.g., in the z direction, as shown in FIG. 11B), but may be of different materials, or otherwise exhibit different values for magnetic permeability. For example, the thicknesses of segments 915*a* and 915*b* are substantially the same, but each may be of a different material and/or have a different magnetic permeability. FIGS. 11A and 11**B are example embodiments only, and other configurations and/or combinations of material may be used. For example, in some embodiments, a magnetic film may exhibit both variable thicknesses and variable magnetic permeabilities across its surface.

Figure 12A:
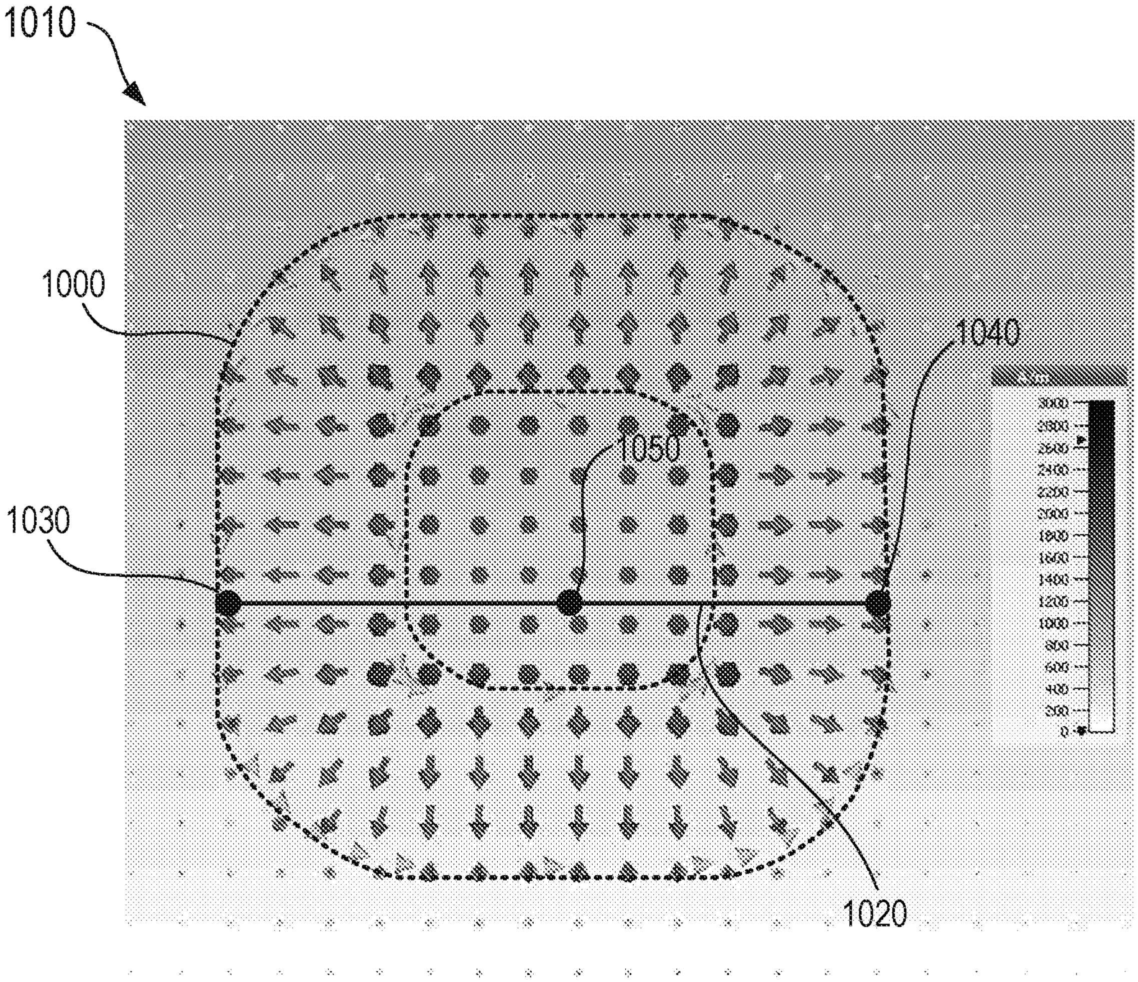
FIGS. 12A-12B provide plots illustrating the magnetic field strength and magnetic flux density for a magnetic film assembly, in accordance with an embodiment of the present description.
Figure 12B:
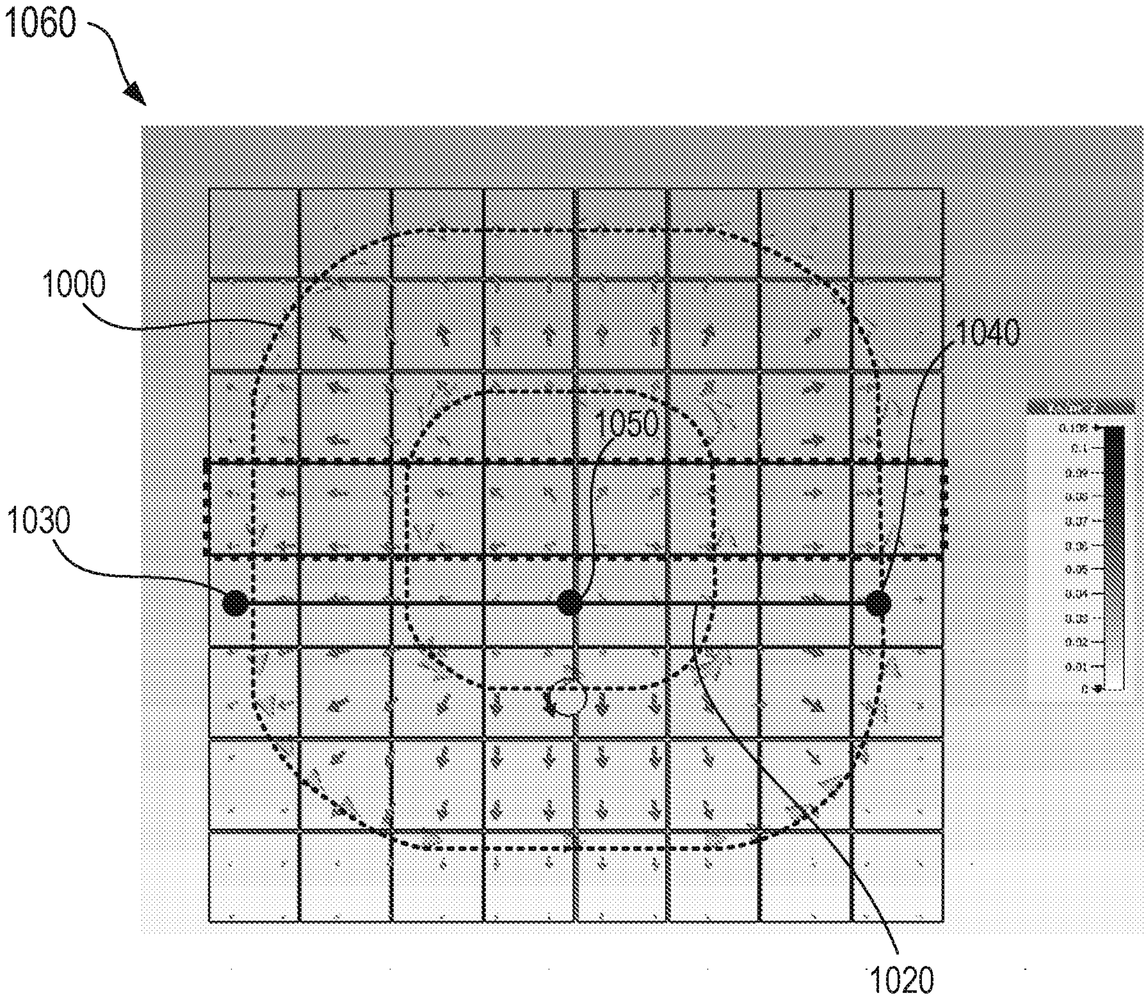

Finally, FIGS. 12A-12B provide plots illustrating the magnetic field strength and magnetic flux density for a magnetic film assembly, according to the present description. It is useful to examine the plots simultaneously for the following description. FIG. 12A shows a plot of the magnetic field 1010 generated by a substantially planar coil 1000 when energized, and without a magnetic film disposed near the coil. The arrows shown in the plot represent the magnitude of the magnetic field strength, H, by their relative size (with larger arrows showing larger values of H), and the direction of the magnetic field (i.e., the direction the arrow is pointing indicates the direction of the lines of the magnetic force). If we examine a hypothetical line of interest 1020 projected across the field 1010, it can be seen that the magnetic field is oriented substantially along the line of interest 1020 at each of opposite first endpoint 1030 and second endpoint 1020, and oriented substantially orthogonal to the line of interest at the midway point 1050. It can also be seen that the magnitude of the in-plane magnetic field 1010 is greatest in the regions corresponding to the conductors (i.e., turns) of the coil 1000, and relatively smaller outside the outer edges of the coil 1000.

FIG. 12B provides a plot of the magnetic flux density B 1060 generated by coil 1000 when a magnetic film is disposed on the coil so as to be substantially parallel to the coil and including the line of interest 1020. When coil 1000 is energized, the magnetic flux density 1060 induced is oriented substantially along the line of interest at least at the first endpoint 1030, second endpoint 1040, and midway point 1050. The magnitude of the magnetic flux density 1060 near the line of interest is also relatively uniform.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A magnetic film assembly comprising:

a coil comprising a plurality of turns defining a first major boundary surface of the coil, such that when energized, the coil generates an in-plane magnetic field component in a region of interest in air proximate and substantially parallel to the first major boundary surface, the in-plane magnetic field component having a magnetic field strength H that varies between a maximum Hmax and about 10% of Hmax in the region of interest in air, wherein the region of interest comprises a line segment in air that is immediately adjacent and parallel to the first major boundary surface and that extends between first and second endpoints proximate outermost turns of the coil and a midway point aligned with a center of the coil; and a magnetic layer disposed on the coil so as to comprise the region of interest, such that when energized, the coil generates, in the region of interest, an in-plane magnetic field component having a magnetic field strength H that decreases from a maximum Hmax at a location adjacent at least one of the outermost turns of the coil to not more than 0.10·Hmax at a location adjacent the center of the coil, and the magnetic layer is configured such that, in the region of interest, an induced in-plane magnetic flux density B varies by no more than 5% over the region of interest, wherein the magnetic layer comprises a plurality of discrete magnetic segments arranged along length, width, and thickness directions of the magnetic layer, the magnetic layer comprising a central region proximate a center of the coil, a peripheral region proximate a periphery of the coil, and a middle region disposed between the central and peripheral regions, the magnetic layer having respective average thicknesses Tcen, Tmid, and Tper in the central, middle, and peripheral regions such that Tmid is greater than Tcen and greater than Tper.

2. The magnetic film assembly of claim 1, wherein the coil is substantially a planar coil, the first major boundary surface is a substantially planar surface, and wherein the coil defines a second substantially planar major boundary surface of the coil opposite and substantially parallel to the first major boundary surface.

3. The magnetic film assembly of claim 1, wherein the coil is substantially a helical coil, the first major boundary surface is a substantially cylindrical outer surface, and wherein the coil defines a substantially cylindrical major inner boundary surface of the coil opposite to, and substantially concentric with, the first major boundary surface.

4. The magnetic film assembly of claim 1, wherein in a plan view, the magnetic layer substantially completely covers the coil.

5. The magnetic film assembly of claim 1, wherein in a plan view, the magnetic layer covers only a portion of the coil.

* * * * *